Aug. 20, 1946.   R. R. STEVENS   2,406,264
CONTROL APPARATUS
Filed May 22, 1943   2 Sheets-Sheet 1

INVENTOR
Roy R. Stevens
BY
ATTORNEY

Aug. 20, 1946.  R. R. STEVENS  2,406,264
CONTROL APPARATUS
Filed May 22, 1943  2 Sheets-Sheet 2

INVENTOR
Roy R. Stevens
BY
ATTORNEY

Patented Aug. 20, 1946

2,406,264

UNITED STATES PATENT OFFICE 2,406,264

CONTROL APPARATUS

Roy R. Stevens, Forest Hills, Pa., assignor to The Westinghouse Air Brake Company, Wilmerding, Pa., a corporation of Pennsylvania Application May 22, 1943, Serial No. 488,042

5 Claims. (Cl. 60—97)

This invention relates to control apparatus for prime movers and more particularly to manually operative means for controlling different operations of one or more prime movers of the Diesel type.

One object of the invention is the provision of a control apparatus for selectively controlling the starting, reversing and/or speed or power output of a plurality of reversible Diesel engines either individually or in multiple.

Another object of the invention is the provision of a control apparatus of the above type employing fluid under pressure as the controlling medium which provides for prompt and accurate control and is particularly adapted for remote control.

Other objects and advantages will be apparent from the following more detailed description of the invention.

Figure 1:
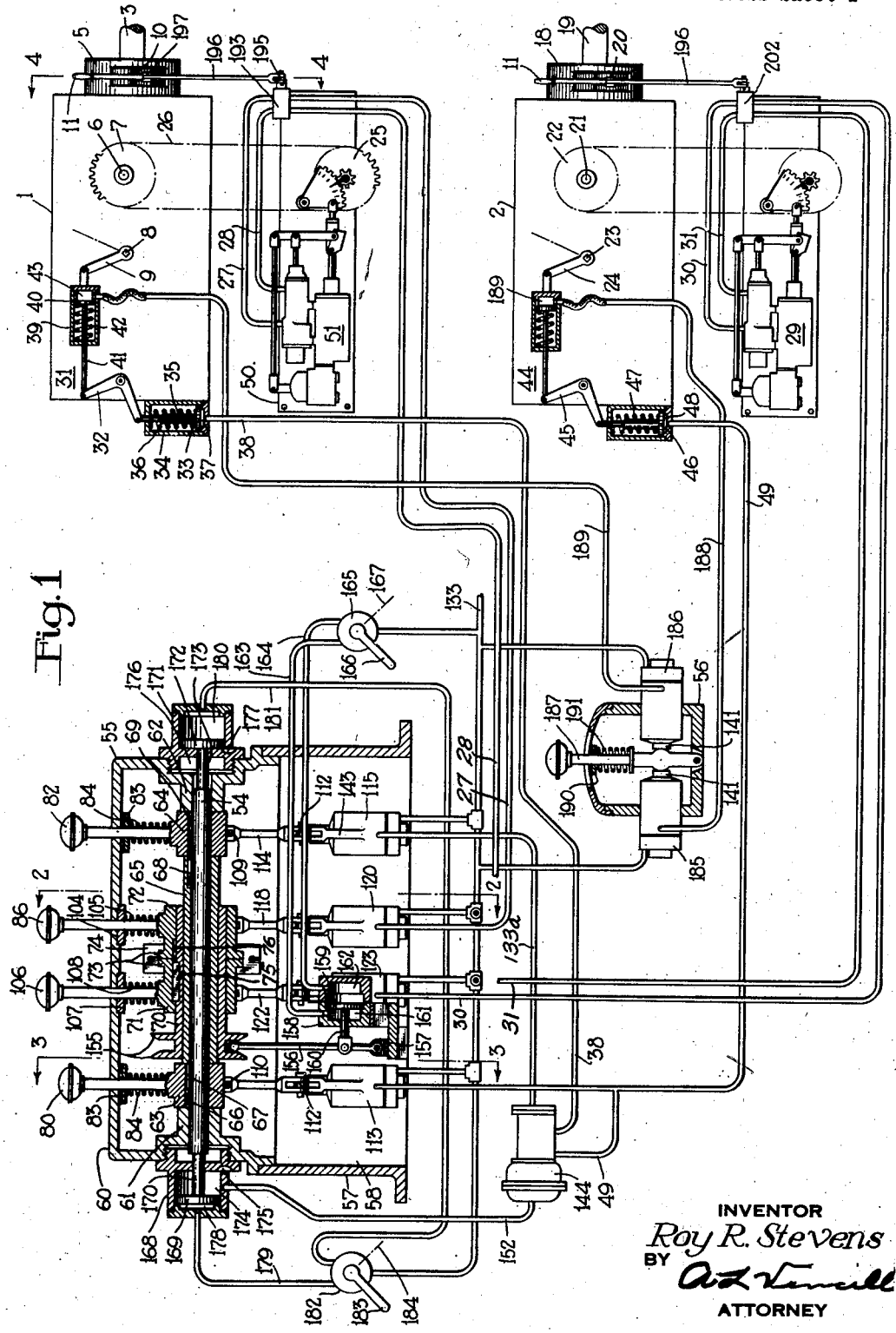
Figure 2:
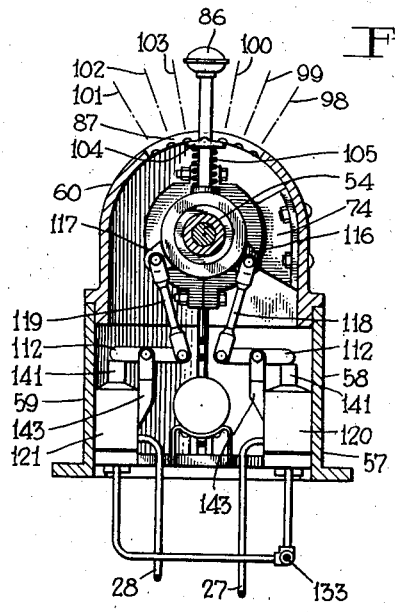
Figure 3:
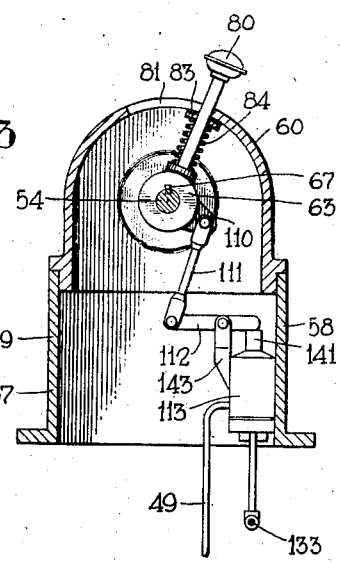
Figure 4:
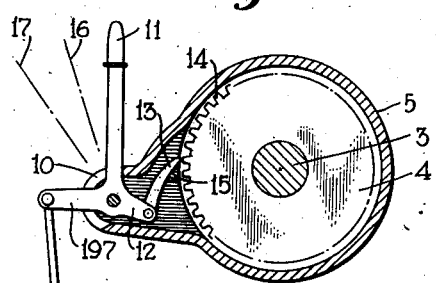
Figure 5:
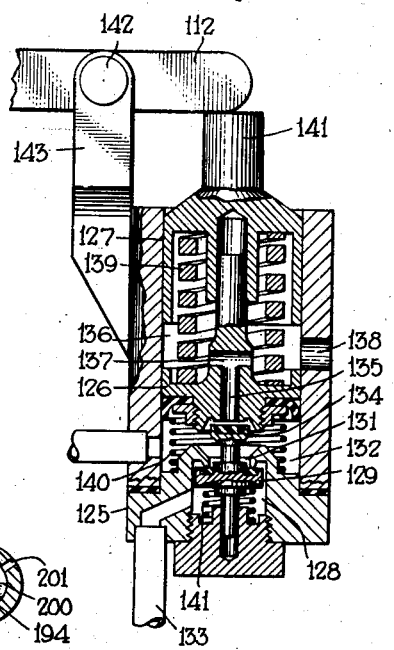
Figure 6:
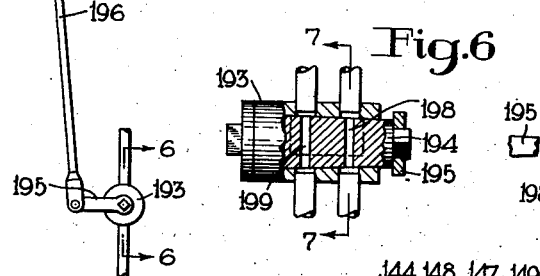
Figures 7, 8:
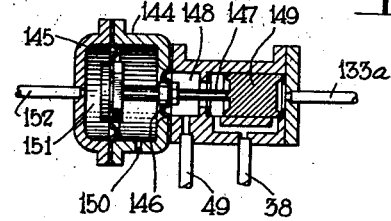

In the accompanying drawings; Fig. 1 is a diagrammatic view, partly in section and partly in outline of a control apparatus embodying the invention; Figs. 2, 3 and 4 are sectional views taken on the lines 2—2, 3—3 and 4—4 in Fig. 1; Fig. 5 is a longitudinal sectional view of a self-lapping valve structure employed in several devices shown in Fig. 1; Fig. 6 is a longitudinal sectional view of an interlock device shown in elevation in Fig. 1; Fig. 7 is a sectional view taken on line 7—7 in Fig. 6; and Fig. 8 is a sectional view of the double check valve device shown in elevation in Fig. 1.

Description

In the drawings, the reference numerals 1 and 2 indicate two like Diesel engines of the reversible type. The engine 1 is connected to drive a shaft 3 and is provided with a fly-wheel 4 within a housing 5 secured to one end of the engine. Projecting from one side of the engine 1 is a so-called maneuvering shaft 6 for controlling the starting and reversing of the engine. The shaft 6 may have a neutral position for stopping the engine and at one side of neutral position, the shaft may have primary and secondary start positions for starting the engine in one direction, and a running position in which it will remain after the engine is started. At the opposite side of the neutral position shaft 6 may have primary and secondary start positions for starting the engine in the reverse direction, and a running position to which the shaft will be turned and then left while operating in the reverse direction. A sprocket wheel 7 is secured to the shaft 6 for turning it to its different positions.

Also projecting from the side of engine 1 is a governor shaft 8 for controlling the fuel supply to and thereby the speed or power output of the engine. A lever 9 is connected to the shaft 8 for operating same. This lever may have an engine idling position in which it is shown and it may be rockable from this position in a clockwise direction, as viewed in the drawing, for increasing the engine speed or power output.

Associated with the fly-wheel housing 5 of engine 1 is a manual turning device 10 for turning the crank shaft (not shown) of the engine for the purpose of timing the engine, fitting connecting rod bearings, etc. This turning device may comprise a manual operating lever 11 having a fulcrum connection with the housing 5 and provided with an arm 12 to the end of which is connected one end of a dog 13. The opposite end of dog 13 is arranged to engage gear teeth 14 provided around the fly-wheel 4. In the normal position of lever 11 shown in Fig. 4, the dog 13 is supported out of contact with the teeth 14 by a pin 15 secured in the housing 5. Upon movement of lever 11 in a counterclockwise direction as viewed in Fig. 4, the dog 13 will engage a tooth 14 when the lever obtains a position such as indicated by a dot and dash line 16. Movement of the lever from this position to a position such as indicated by a dot and dash line 17 will actuate the dog 13 to turn the fly-wheel one tooth. Movement of the lever back and forth between the positions indicated by lines 16 and 17 will ratchet the fly-wheel 4 around, as will be apparent. Return of lever 11 to normal position will disengage dog 13 from the fly-wheel 4.

The engine 2 is connected to drive a shaft 19 and has a housing 18 containing a fly wheel (not shown), a manual turning device 20, a maneuvering shaft 21 turnable by a sprocket wheel 22, and a governor shaft 23 adjustable by a lever 24; these parts being identical to the corresponding parts associated with engine 1.

The engines 1 and 2 and the parts associated therewith and above decribed may be of any conventional type well known to those skilled in the art, in view of which, and of the fact that the specific nature of these parts is not essential to a clear understanding of the invention, a more detailed description thereof is deemed unnecessary.

Mounted on a panel 50 associated with engine 1 is a fluid motor 51 connected through the medium of a sprocket wheel 25 and chain 26 to the sprocket wheel 7. This motor is operative to turn the maneuvering shaft 6 to its different positions and is controlled by pressure of fluid provided in either of two control pipes 27 and 28, which may be called forward and reverse pipes, respectively. When both of these pipes are open to atmosphere, the motor 51 will position the maneuvering shaft 6 in its neutral position. Upon supply of fluid at a certain pressure to pipe 27, motor 51 will turn the maneuvering shaft 6 to its primary start position at one side of neutral. When this pressure is reduced to a certain lower degree the motor 51 will turn shaft 6 to its secondary start position, and when reduced to a still lower degree, the shaft 6 will assume its running position. Upon opening of pipe 27 to atmosphere, with pipe 28 also open to atmosphere, motor 51 will return shaft 6 to its neutral position for stopping the engine. Starting and running of engine 1 in the reverse direction may be obtained by operation of motor 51 in response to the provision in pipe 28 of fluid at the same different pressures as provided in pipe 27 as just described.

A like fluid motor 29 controlled through forward and reverse pipes 30 and 31 is associated with engine 2 for controlling the maneuvering shaft 21 thereof in the same manner as just described for engine 1.

The two motors 51 and 29 may be structurally and operatively identical to corresponding parts fully disclosed and described in my copending application Serial No. 463,792, filed October 29, 1942, now Patent No. 2,383,278. A further description of these parts in the present application is not deemed essential to a clear understanding of the invention and will therefore be omitted.

The governor lever 9 associated with engine 1 is connected through an extensible link 31 to one arm of a bell crank 32 which at its knee is pivoted on said engine. The other arm of the bell crank is connected to one end of a rod 35 projecting from one face of a piston 33 contained in a cylinder 34 which is secured to the engine. A spring 36 encircling rod 35 within the cylinder 34 is provided for urging the piston 33 to an engine idling position shown in the drawings for thereby positioning, through the medium of link 31, the governor arm 9 in its idling position. At the opposite face of piston 33 is a pressure chamber 37 connected to a control pipe 38.

The extensible link 31 comprises a cylinder 39 operatively connected to the governor lever 9 and containing a piston 40 operatively connected through the medium of a rod 41 to the bell crank 32. A spring 42 in cylinder 39 acts on one side of the piston 40, while at the opposite side of the piston is a pressure chamber 43. When the pressure chamber 43 is at substantially atmospheric pressure the spring 42 is arranged to hold the piston 40 in the position shown in the drawings whereby the link 31 may provide a substantially rigid operating connection between the governor lever 9 and the bell crank 32. Upon supply of fluid to chamber 43, in a manner which will be later described, at a pressure which overcomes the opposing force of spring 42, the cylinder 39 will move relative to the piston 40 to an extent depending upon the degree of such pressure for effecting a corresponding adjustment of the lever 9 relative to the bell crank 32.

The engine 2 is provided with a like extensible link 44 operatively connecting the governor lever 24 to a bell crank 45 which is also connected to a piston 46 contained in a cylinder device secured to said engine, the piston being subject to the opposing pressures of a spring 47 and of fluid in a pressure chamber 48 which is connected to a control pipe 49.

The starting and reversing control motors 51 and 29 and the governor control cylinders 34 and 47 are arranged to be remotely controlled from a control stand 55. On a ship this stand may be located in the pilot house. The extensible links 31 and 44 are arranged for control from a vernier control device 56 which may be associated with the stand 55.

The control stand 55 may comprise a hollow base portion 57 having oppositely arranged side walls 58 and 59 and a cover 60 secured to said base portion. A shaft 54 disposed within the cover 60 is supported at its opposite ends in bearings 61 and 62 provided in the end walls of said cover, which bearings provide for both rotary and longitudinal movement of such shaft. Two operating members 63 and 64 are mounted on shaft 54 adjacent the bearings 61 and 62, respectively, and are maintained in spaced relation by a sleeve 65 disposed on said shaft with its opposite ends in engagement with said members. The shaft 54 carries a key 66 which is disposed to slide in a slot 67 extending longitudinally of the member 63. The shaft 54 is also provided with a key 68 and the member 64 has a longitudinally arranged slot 69 for receiving said key. In the drawing the key 68 is shown out of the slot 69 and disposed in a slot in the sleeve 65, to provide for rotary motion of member 64 on and relative to the shaft 54. With the key 68 moved into slot 69, in a manner which will be later described, the shaft 54 will be secured to said member for movement thereby. The other key 66 is at all times disposed in slot 67 in member 63.

A sleeve 70 is supported for longitudinal movement on and relative to the sleeve 65, and mounted on sleeve 70 are two operating members 71 and 72 provided on their adjacent ends with abutting annular collars 73 which are disposed to turn in an annular recess provided in a member 74 which is secured to the cover. Interengagement between member 74 and the two collars 73 is arranged to secure the members 71 and 72 against longitudinal movement. The sleeve 70 carries a key 75 which is constantly disposed in a slot in the member 71 for securing the sleeve to turn with said member, and the member 72 has a slot 76 for receiving the key 75 upon longitudinal movement of the sleeve 70 for securing the member 72 to member 71, whereby both will move in unison.

A lever 80 extending from the outside of the cover through a slot 81 therein has one end connected to the member 63 for turning same and thereby the shaft 54 in its bearings. A like lever 82 extending through a like slot in the casing has one end connected to the member 64 mounted on shaft 54. These levers and the slots through which they extend are identical, and comprise speed or power output control levers for the engines 2 and 1, respectively. With the levers 80 and 82 at one end of the respective slots, such as indicated in Fig. 3, the engines will operate at an idling speed, and movement of the levers away from this end of the slot is intended to cause acceleration or an increase in the power output of the engines in accordance with the extent of such movement, as will be later described. Mounted on each of the levers 80 and 82 within the cover 60 is a friction shoe 83 having sliding contact with the interior surface of the cover and urged into contact with said surface by a spring 84 encircling the respective lever and carried by the member 63 or 64 as the case may be. The friction between the shoes 83 and cover is intended to hold the levers 80 and 82 in any adjusted position within the respective slot, without the use of manual force.

The member 72 mounted on sleeve 70 is provided with an operating lever 86 which extends through a slot 87 in the cover 60. Movement of the lever in slot 87 will rock the member 72. The lever 86 may have a neutral position in which it is shown in Fig. 2. At one side of neutral position the lever 86 may have a primary start position, a secondary position and a running position indicated in Fig. 2 by dash and dot line 98, 99, and 100, respectively, and which correspond to the positions of the maneuvering gear shaft 6 of engine 1 at one side of its neutral position. The lever 86 may have like positions at the opposite side of its neutral position, as indicated in Fig. 2 by dash and dot lines 101, 102 and 103, respectively, corresponding to the positions of the maneuvering gear shaft 6 of engine 1 at the opposite side of its neutral position.

Slidably mounted on lever 86 within the cover 60 is a detent 104, and the cover is provided with a plurality of notches shown in Fig. 2 arranged to receive said detent in the different positions of said lever for defining such positions. A spring 105 carried by the lever acts on the detent 104 for urging same against the cover and thereby into the respective recesses in the different positions of the lever.

The operating member 71 is connected to one end of a lever 106 which extends through a slot in the cover, like slot 87. The lever 106 has a plurality of different operating positions in the slot like the positions of lever 86, for controlling the positioning of the maneuvering shaft 21 of engine 2. The lever 106 also carries within the cover a detent 107 and a spring 108 for urging the detent against the inner surface of the cover which is provided with recesses for receiving the detent to define the different positions of the lever. These recesses are not shown in the drawings but may be like the recesses provided to receive detent 104.

The member 63 is provided with an arm 110 which is pivotally connected to one end of a link 111. The opposite end of link 111 is connected to a self-lapping fluid pressure control valve device 113 which is mounted on the side wall 58 of the base member and which is arranged to control the pressure of fluid in the speed control pipe 49 leading to engine 2. The member 64 is provided with an arm 109, like the arm 110 and which is connected through the medium of a link 114 to a self-lapping control valve device 115 which is mounted on side wall 58 of the base member and which is arranged to control pressure of fluid in the speed control pipe 38 leading to the engine 1.

The operating member 72 is provided with two oppositely arranged arms 116 and 117 connected by links 118 and 119 to self-lapping control valve devices 120 and 121 which are provided for controlling pressure of fluid in pipes 27 and 28, respectively. The member 71 is also provided with oppositely arranged arms not shown but like the arms of member 72 and these arms are connected through the medium of links to self-lapping valve devices for controlling the pressure of fluid in pipes 30 and 31, only one of these links and self-lapping valve devices being shown in the drawings and being indicated by the reference numerals 122 and 123, respectively.

It is desired now to point out that the lever 80 and self-lapping valve device 113 constitute the speed or power output control means for the engine 2, while the like lever 82 and self-lapping valve device 115 constitute the speed or power output control means for engine 1. The lever 86 and self-lapping control valve device 120 and 121 controlled thereby constitute means for controlling, through the medium of the fluid motor 51, the positioning of the maneuvering gear shaft 6 of engine 1, while the like lever 106 and the two self-lapping valve devices including the device 123 constitute means for controlling, through the medium of fluid motor 29, the positioning of the maneuvering shaft 21 of engine 2.

Each of the self-lapping valve devices 113, 115, 120, 121, 123 and the one not shown may be of identical structure and as shown in Fig. 5 may comprise a casing having a through bore one end of which is closed by a cover 125 and in which there is slidably mounted at one side of the cover a piston 126 and a plunger 127, the piston being interposed between said cover and plunger. The cover 125 has a supply valve chamber 128 containing a supply valve 129 arranged to control communication between said chamber and a bore 131 which is open to a chamber 132 formed between the cover and the piston 126. The supply valve chamber 128 in each of the self-lapping valve devices is opened to a pipe 133 which is constantly supplied with fluid under pressure from any suitable source. The chamber 132 in the valve devices 113 and 115 are connected to pipe 49 and 133a, respectively. In the valve devices 120 and 121 the chamber 132 is open to pipes 27 and 28 respectively, while in the valve devices including 123 controlled by lever 106 this chamber is connected to pipes 30 and 31.

The supply valve 129 has a stem loosely extending through the bore 131 into chamber 132 wherein on its end there is provided a release valve 134 arranged to cooperate with an annular seat provided on the piston 126 around a bore 135 therein for controlling communication between chamber 132 and a chamber 136 at the opposite side of the piston, to which chamber 136 the bore 135 is open by way of a passage 137. The chamber 136 is in constant communication with the atmosphere through a passage 138 and contains a control spring 139 bearing at opposite ends against the piston 126 and plunger 127. A bias spring 140 is provided in chamber 132 to act on the piston 126 for urging same in the direction away from the release valve 134. A seating spring 141 in chamber 128 acts on the supply valve 129 for urging it to its closed position shown.

The plunger 127 is provided with an axial extension 141 for engagement by one end of a lever 112 which is fulcrumed intermediate its ends on a pin 142 carried by a bracket 143 projecting from the casing of the device. The opposite end of this lever in the self-lapping valve devices 113 and 115 is connected to links 111 and 114 respectively, while in the other self-lapping valve devices 120, 121 and 123, it is connected to links 118, 119, and 122, respectively.

When the plunger 127 occupies the position shown in the drawing the pressure of spring 139 on the piston 126 is substantially fully relieved to thereby allow bias spring 140 to move the piston 126 to the position shown to allow closing of the supply valve 129 and opening of the release valve 134 to thereby connect chamber 132 and the connected pipe to the atmosphere through bore 135 in the piston and thence by way of passage 138.

When the lever 112 is rocked in a direction to urge the plunger 127 toward the piston 126 this movement of said plunger acts through the control spring 139 to first move the piston 126 into contact with the release valve 134 and to then move said release valve to unseat the supply valve 129. Upon opening of supply valve 129 fluid under pressure will flow from chamber 128 to chamber 132 and thence to the connected pipe and when this pressure acting on piston 126 becomes increased to a degree sufficient to overcome the force of spring 139 the piston 126 will move against said spring relative to the plunger 127 to allow closing of the supply valve 129 when the pressure of fluid obtained in chamber 132 is increased to a degree determined by the displacement of plunger 127 from its normal position shown. If the plunger 127 is moved further against spring 129 the structure will operate to correspondingly increase the pressure of fluid in chamber 132. If, however, the lever 112 is operated to allow the force of spring 139 to move the plunger 127 in a direction away from piston 126, the consequent reduction in force of said spring on said piston will allow the pressure of fluid in chamber 132 to move the piston 126 upwardly and away from the release valve 134. Fluid under pressure will then flow from chamber 132 past the release valve to atmosphere and reduce the pressure of fluid in said chamber to below the pressure of spring 139 on said piston. When the pressure in chamber 132 is reduced sufficiently, the spring 139 will move the piston 126 back into contact with the release valve 134 to thereby limit the reduction in pressure in said chamber to a degree corresponding to the reduced force of spring 139, as determined by the position of plunger 127 with respect to its normal position. If the plunger 127 is allowed to return further toward its normal position a corresponding further reduction in pressure of fluid in chamber 132 will occur, while in case the lever 112 is operated to allow plunger 127 to return to its normal position shown in the drawing a complete release of fluid under pressure from chamber 132 and the connected pipe will result. It will thus be apparent that this self-lapping valve structure will vary the pressure of fluid in chamber 132 and thereby in the connected pipe in accordance with the position of the operating lever 112 away from its normal position and, in turn, in accordance with the position of the respective operating lever 80, 82, 86 or 106.

It will now be seen that the lever 80 in its normal or idling position shown, the speed control pipe 49 leading to engine 2 will be at atmospheric pressure to allow the speed control piston 46 associated with said engine to move to its engine idling position shown in the drawings. Movement of the lever 80 out of idling position will actuate the self-lapping valve device 113 to supply fluid under pressure to pipe 49 to adjust the piston 46 to a position in its cylinder corresponding to the extent of movement of said lever away from idling position, to thereby provide for a corresponding increase in speed or output of engine 2. Any desired degree of speed or power output of engine 2 may therefore be obtained by the proper positioning of lever 80. In the same manner, the lever 82 is arranged to control the pressure of fluid in the speed control cylinder 34 of engine 1 through the medium of the self-lapping valve device 115 and pipe 38 which is normally connected to pipe 133a by way of an interlock valve device 144 in a manner which will be later described, for thereby regulating the speed or power output of said engine in accordance with the position of said lever.

It will be seen that movement of lever 86 in either direction from its neutral position to its different positions hereinbefore described in connection with Fig. 2, will cause operation of fluid motor 51 to correspondingly position the maneuvering gear shaft 6 of engine 1. The engine 1 may be caused to start and operate in one direction upon movement of lever 86 in one direction from its neutral position or in the reverse direction upon movement of said lever in the opposite direction from its neutral position, or movement of said lever to neutral position will cause stopping of said engine. The engine 2 will operate in a like manner in response to operation of the lever 106.

The interlock valve device 144 comprises a casing containing two spaced flexible diaphragms 145 and 146. The diaphragm 146 is of smaller area than the diaphragm 145 and both are connected to a common stem 147 extending into a chamber 148 which is in constant communication with pipe 49. The stem is connected to move a double check valve 149 arranged to control communication between pipe 38 and pipe 49 on the one hand and pipe 38 and pipe 133a on the other hand. With the check valve in the position shown in Fig. 8 the pipe 38 is disconnected from pipe 133a and opened to pipe 49. In an opposite or left-hand position of the double check valve, communication is closed between pipe 38 and pipe 49, and pipe 38 is opened to pipe 133a, which provides for control of the speed or power output of the engine 1 by operation of lever 82, as above described.

The space between the two diaphragms 145 and 146 is open to the atmosphere through a port 150. At the opposite side of diaphragm 145 is a chamber 151 which is connected to a pipe 152. When this pipe and thereby chamber 151 are open to the atmosphere, in a manner which will be presently described, the double check valve 149 will be movable to the position for opening pipe 133a to pipe 38, as just mentioned.

Independent operation of levers 80, 82, 86 and 106 and thereby individual control of the maneuvering gear shafts 6 and 21 and of the speed or power output of the engines 1 and 2 as above described is dependent upon the shaft 54 and sleeve 70 occupying the positions shown in Fig. 1. Multiple control or control in unison of the maneuvering gear shafts 6 and 21 and of the speed or power output of the two engines is provided for by structure which will now be described.

One end of sleeve 70 is provided with two spaced annular collars 155 between which is disposed one end of a lever 156 which is fulcrumed at its opposite end on a lug 157 provided on a portion of the base portion 57. A cylinder 158 secured to the base portion 57 contains a piston 159 which is provided with a rod 160 projecting through a pressure chamber 161 at one side of the piston to the exterior of the cylinder and having its end connected to the lever 156 intermediate its ends. At the opposite side of piston 159 is a pressure chamber 162. The pressure chambers 161 and 162 are connected by pipes 163 and 164, respectively, to a manually operative selector valve device 165 having a control handle 166. This valve device may be of any suitable structure for connecting either of the pipes 163 or 164 to the fluid pressure supply pipe 133 while opening the other pipe to atmosphere. The lever 166 for controlling the valve device 165 may have a position in which it is shown for opening pipe 163 to atmosphere and for opening pipe 164 to the fluid pressure supply pipe 133 to thereby provide fluid under pressure in pressure chamber 162 at one side of the piston 159. This pressure acting on the piston 159 will move the piston to the position shown for thereby operating the lever 156 to shift the sleeve 70 longitudinally on the sleeve 65 for withdrawing the key 75 from slot 76 in the member 72. With the key 75 in this position independent operation of the levers 86 and 106 in the manner above described is provided for.

The lever 166 of the selector valve device is also movable to a second position indicated by a dash and dot line 167 for opening pipe 164 to the atmosphere and for connecting pipe 163 to the fluid pressure supply pipe 133. In this position of lever 166 fluid under pressure will then flow to pressure chamber 161 and move the piston 159 in the direction of the right hand. This movement of the piston will operate the lever 156 to shift the sleeve 70 longitudinally of the sleeve 65 in the direction of the right-hand, and with the lever 86 disposed in the same plane as lever 106, as in neutral position of both of said levers, the slot 76 in member 72 will be aligned with the key 75 so that said key will enter said slot and be moved into engagement with the inner end thereof. In this position of key 75 a portion of it will be disposed in each of the members 72 and 71 thereby securing the two levers 86 and 106 together for movement in unison. With the two levers 86 and 106 thus secured together for movement it will be seen that movement of either will cause simultaneous and like operation of the two fluid motors 51 and 29 and thereby like positioning of the maneuvering gear shafts 6 and 21 of the two engines 1 and 2.

When it is desired to change the control of the maneuvering gear shafts 6 and 21 from multiple to individual, lever 166 of the selector valve device 165 is returned to the position shown in the drawing to thereby cause the piston 159 to move sleeve 70 to its left hand position in which the key 75 is out of slot 76 disconnecting said sleeve from the operating member 72.

A cap 168 is secured over the bearing 61 in cover 60 and contains a piston 169 having a rod 170 engaging the adjacent end of shaft 54. A like cap 171 is secured over the bearing 62 and contains a piston 172 having a rod 173 engaging the adjacent end of shaft 54. The rod 170 extends through a non-pressure chamber 174 which may be opened to the atmosphere as by way of a port 175, while a corresponding chamber 176 at the adjacent side of piston 172 may be open to the atmosphere by way of a port 177. At the opposite side of piston 169 is a pressure chamber 178 connected to a pipe 179, while at the opposite side of piston 172 is a pressure chamber 180 connected to a pipe 181. The pipes 179 and 181 are connected to a manually operative selector valve device 182 arranged to control communication between said pipes and the fluid pressure supply pipe 133 and the atmosphere. This selector valve device may therefore be like the selector valve device 165 and may have an operating handle 183 having one position in which it is shown in the drawings and another position as indicated by a dot and dash line 184.

With lever 183 of the selector valve device 182 in the position shown it opens pipe 179 to the atmosphere and connects pipe 181 to the fluid pressure supply pipe 133 to thereby supply fluid to chamber 180 at one side of the piston 172. Since at this time chamber 178 at the opposite side of piston 169 is open to atmosphere, the pressure in chamber 180 acting on piston 172 will shift the shaft 54 longitudinally relative to the members 64 and 63 and sleeve 65 to the position shown in the drawing in which the key 68 is moved out of slot 69 in member 64 to thereby allow individual operation of the levers 80 and 82 for controlling the speed of the two engines, as above described.

If it is desired to control the speed of both engines in unison, the lever 183 of the interlock valve device 182 is moved from the position shown to that indicated by dot and dash line 184 in which pipe 181 is opened to the atmosphere and pipe 179 is connected to the fluid pressure supply pipe 133. Fluid under pressure will then flow to chamber 178 at one side of the piston 169, and since chamber 180 at the opposite side of piston 172 is open to the atmosphere at this time, the piston 169 will shift shaft 54 longitudinally in the direction of the right hand relative to the sleeve 65 and member 64. With the lever 82 disposed in the same plane as lever 80, as with both levers in their idling positions, the slot 69 in member 64 will be aligned to receive the key 68 so that the piston 169 will move the shaft 54 to a position defined by contact between said piston and the inner wall of the bore in which it operates and in which the key 68 will be disposed partly in slot 69 in member 64 and partly in the sleeve 65 thereby securing the lever 82 to the shaft 61 to which the lever 80 is constantly connected. With the key 68 thus positioned both of the levers 80 and 82 will move together so that operation of either one will control the speed of both engines simultaneously thus providing for multiple control of speed of the two engines.

Return of lever 183 of the selector valve device 182 to the position shown in the drawing, with a consequent release of fluid under pressure from chamber 178 and supply of fluid under pressure to chamber 180 to act on piston 172, will cause shifting of the shaft 54 back to the position shown in the drawing for disconnecting the levers 80 and 82 to thereby allow individual adjustment of said levers and individual control of the speed or power output of the two engines.

With the piston 169 in the position shown in the drawings diaphragm chamber 151 in the interlock valve device 144 is open to the atmosphere by way of pipe 152, non-pressure chamber 174 and the atmospheric port 175, so that when fluid under pressure is supplied to pipe 133a by operation of lever 82 for controlling the speed of engine 1, such pressure acting on one end of the double check valve 149 will be able to shift said check valve to its opposite seating position to thereby open pipe 133a to pipe 38 whereby control of the speed of engine 1 in response to operation of lever 82 is obtained. However, when piston 169 is moved to its inner position to provide for multiple control of the speed of both engines, the pipe 152 is opened to chamber 178 so that fluid under pressure will flow to diaphragm chamber 151 in the interlock valve device 144. Fluid under pressure thus supplied to chamber 151 will deflect the diaphragm 145 and move the double check valve 149 to the position shown in the drawings for thereby closing communication between pipe 133a and pipe 38 and for opening the latter to pipe 49. In other words, in this position of the interlock valve device the speed control pistons 33 and 46 of both engines will be connected to pipe 49 for control by the self-lapping valve device 113 controlled by lever 80, to thereby assure the same degree of speed control pressure on both of said pistons, whereas such like pressures might not be obtained by the self-lapping valve devices 113 and 115 in the same position of levers 80 and 82. It will be noted that while the speed or power output of both engines is controlled by the self-lapping valve device 113 in multiple control, said device is operative by either of the levers 80 or 82 since these levers are secured together for movement in unison.

In multiple control of the two engines the adjustment of speed of the engines is effected by movement of pistons 33 and 46 in the two cylinder devices 34 and 47 and through the extensible links 31 and 44, respectively, and while this movement will be substantially the same due to said pistons being subjected to the same pressure of fluid, there might be a slight difference in the speed or power output of one of the engines with respect to that of the other. In order to equalize the work of the two engines or to synchronize their speeds particularly when connected to individual devices such as the propellers of a ship, the extensible links and vernier control valve device is provided.

The vernier control valve device 56 comprises two self-lapping control valve devices 185 and 186 which may be identical to the structure shown in Fig. 5 and hereinbefore described. These two valve devices are arranged oppositely to each other with the plungers 141 engaging opposite sides of a lever 187. Movement of the lever 185 from a neutral position in the direction of the device 185 will actuate same to supply fluid under pressure to a pipe 188, while movement in the opposite direction from the neutral position shown will supply fluid to a pipe 189. The pipe 189 leads to pressure chamber 43 in the extensible link 39 while the pipe 188 leads to a corresponding pressure chamber in the link 44. If the valve device 56 is operated to supply fluid to pipe 189 and thence to pressure chamber 43 in link 31, this pressure, when it overcomes the opposing force of spring 42 on cylinder 39, will move said cylinder relative to the piston 40, the position of which is fixed by piston 33 in cylinder 34, to thereby rock the lever 9 in a direction for increasing the speed of engine 1 with respect to the speed provided by the pressure of fluid supplied to the cylinder device 34. This increase in speed of engine 1 with respect to the speed of engine 2 may be adjusted or limited according to the pressure of fluid supplied to the pressure chamber 43 by operation of the vernier control valve device 56, whereby the speed of said engine may be brought into synchronism with that of engine 2, or the work of engine 1 may be adjusted as desired relative to that of engine 2. If however the engine 1 is operating satisfactorily and a slight change in speed or output of engine 2 is desired, the lever 187 of the vernier control device 56 may be moved in the direction to actuate the self-lapping valve device 185 to thereby supply fluid under pressure through pipe 188 to the extensible link 44 for operating same in the same manner as above described in connection with link 39, to increase the speed or output of engine 2. With the lever 187 of the vernier control device 56 in its neutral position both of the pipes 188 and 189 will be opened to the atmosphere thereby venting fluid under pressure from both of the extensible links 39 and 44 to provide for adjustment of the speed or power output of both engines solely in response to operation of the speed control levers 80 and/or 82. A friction shoe 190 is provided on the lever 187 for slidable engagement with an interior surface of the casing of the device and is urged into contact with said surface by a spring 191 to thereby obtain such resistance to movement of said lever as to hold same in any adjusted position without manual effort.

Communication through pipes 27 and 28 to the fluid motor 51 is controlled by an interlock valve device 193. This device as shown in detail in Figs. 6 and 7 comprises a casing containing a plug valve 194 to one end of which is connected an operating lever 195 for turning it to different positions. The lever 195 is connected by a rod 196 to an arm 197 projecting from lever 11 of the turning device 10 associated with engine 1. When the lever 11 is in the normal position shown in Fig. 4, the plug valve 194 is positioned as shown in Figs. 6 and 7 in which position two passages 198 and 199 therein open communication through the pipes 27 and 28, between the fluid motor 51 and the self-lapping control valve devices 120 and 121, respectively, in the control stand 55. When lever 11 is moved from its normal position shown in Fig. 4 for turning the fly-wheel 4 of the engine 1, it acts through the rod 196 to turn the plug valve 194 in its casing, and the parts are so arranged that at the time said lever obtains the position indicated by the dash and dot line 16 communication through pipes 27 and 28 by way of passages 198 and 199 in said valve is broken, and a cavity 200 provided in one side of the valve is moved into register with the portions of said pipes which are connected to the motor 51. The cavity 200 is in constant communication with the atmosphere by way of a vent port 201 through the side of the casing of the device, whereby when the lever 11 obtains the position indicated by the dash and dot line 16 the portion of the control pipes 27 and 28 connected to the motor 51 will be opened to the atmosphere, and this condition will be maintained upon further movement of the lever to the position indicated by the dot and dash line 17. Thus as long as the lever 11 is being operated to turn the fly-wheel 4, the portions of pipes 27 and 28 connected to the motor 51 will be maintained opened to the atmosphere to thereby prevent operation of said motor. Return of lever 11 to its normal position shown in Fig. 4 will operate the interlock valve device 193 to open communication through the pipes 27 and 28 between the fluid motor 51 and control stand 55. By this arrangement the engine 1 cannot be unintentionally started and operated while the engine is being manually turned for purpose of timing, etc.

A similar interlock valve device 202 controls communication through pipes 30 and 31 leading to the fluid motor associated with engine 2 for preventing starting and operation of said motor while the turning device 20 associated therewith is being operated.

*Summary*

From the above description it will now be noted that I have provided a control apparatus for a plurality of reversible Diesel engines whereby the engines may be started and reversed and the speed of the engines may be adjusted, either individually or in multiple. The selection between individual and multiple control is controlled by manually operative selector means. In one position of the selector means individual control of the engines is provided while in another position multiple control is provided. The individual control of starting and reversing, and speed for each engine is through the medium of two levers, one for controlling the starting and reversing of the engine and the other for controlling the speed. For multiple control the like control levers for both engines are secured together for movement in unison so that the operation of one start and reversing lever or of one speed control lever will cause starting, reversing or adjustment of speed of both engines in unison. The control apparatus further embodies means whereby the speed of any one engine may be adjusted relative to that of another in order to equalize the work or to synchronize the speed of the two engines. The engines may be provided with any conventional means for turning same to effect adjustments or repairs of the engines and interlock means are associated with the turning means for preventing undesired starting of the engines while being worked upon.

Having now described my invention, what I claim as new and desire to secure by Letters Patent, is:

1. A control system for controlling an operation of two internal combustion engines, comprising a fluid motor for each engine adjustable by fluid under pressure to control the respective operation, two manually operative control valve means, one for each of said motors, and each being individually operable to vary the pressure of fluid on the respective motor, selector means having one position providing for independent operation of said two valve control means, said selector means being movable to a second position, and means responsive to movement of said selector means to said second position to disconnect one of said fluid motors from its respective control valve means and to connect same to the other control valve means to provide for control of both of said motors in unison from the last named control valve means.

2. In combination, a plurality of fluid pressure adjustable devices, individual fluid pressure control means for each of said devices operable to provide fluid under pressure for adjusting the respective device, selector means having one position for rendering each of said devices adjustable by fluid pressure provided by the respective control means and having a second position for rendering all of said devices adjustable by fluid pressure provided by one of said control means, and means operable to selectively position said selector means.

3. In combination, two fluid pressure adjustable motors, two individual fluid pressure control valve devices, one of said control valve devices being at all times effective to control pressure of adjusting fluid in one of said motors, selector mechanism operable in one position to render the other control valve device effective to control the pressure of fluid in the other motor and operable in a second position to render said one control valve device effective to control the pressure of fluid in said other motor in unison with the control in said one motor, means operable to selectively position said mechanism, and means arranged to control said control valve devices.

4. In combination, two fluid pressure adjustable motors, first and second fluid pressure control valve devices each operable to provide adjusting fluid pressure, two control levers, one for controlling operation of each of said control valve devices, interlock means selectively operable to either connect said levers together for movement by each other or to disconnect said levers from each other to allow individual movement of each lever, selector means operable in one position to effect operation of said interlock means to connect said levers together and operable in a second position to effect operation of said interlock means to disconnect said levers from each other, means providing a constantly open fluid control communication between one of said motors and said first control valve device to render said first control valve device effective at all times to control pressure of adjusting fluid in said one motor, valve means operable to selectively establish a fluid pressure control communication between the other motor and either one of said control valve devices and at the same time to close a communication between said other motor and the other control device, and means operable upon movement of said selector means to said one position to effect operation of said valve means to open communication between said other motor and said first control valve device and operable upon movement of said selector means to said second position to render said valve means effective to open communication between said other motor and second control valve device.

5. In combination, two fluid pressure adjustable motors, first and second fluid pressure control valve devices each operable to provide adjusting fluid pressure, two control levers, one for controlling operation of each of said control valve devices, interlock means selectively operable to either connect said levers together for movement by each other or to disconnect said levers from each other to allow individual movement of each lever, selector means operable in one position to effect operation of said interlock means to connect said levers together and operable in a second position to effect operation of said interlock means to disconnect said levers from each other, means providing a constantly open fluid control communication between one of said motors and said first control valve device to render said first control valve device effective at all times to control pressure of adjusting fluid in said one motor, valve means operable to selectively establish a fluid pressure control communication between the other motor and either one of said control valve devices and at the same time to close a communication between said other motor and the other control device, a movable member operative to control said valve means and controlled by pressure of fluid in a chamber, said member being adapted upon supply of fluid under pressure to said chamber to effect operation of said valve means to establish the fluid pressure control communication between said other motor and said first control valve device and being adapted with fluid under pressure released from said chamber to render said valve means effective to establish the fluid pressure control communication between said other motor and said second control valve device, and means effective upon operation of said selector means to said one position to effect a supply of fluid under pressure to said chamber and upon operation of said selector means to said second position to effect a release of fluid under pressure from said chamber.

ROY R. STEVENS.